United States Patent [19]

Langner

[11] Patent Number: 5,008,010

[45] Date of Patent: Apr. 16, 1991

[54] ROTATING CYLINDRICAL SCREEN WITH FINE MESH MODULAR PANELS

[76] Inventor: Herbert G. J. Langner, R.R. #1, Shallow Lake, Ont., Canada, N0H 2K0

[21] Appl. No.: ,429

[22] Filed: May 9, 1989

[51] Int. Cl.$^5$ .................................... B01D 33/067
[52] U.S. Cl. .................... 210/232; 209/291; 209/407; 210/404; 210/489; 210/500.25
[58] Field of Search .......... 209/291, 290, 407; 210/402, 403, 404, 499, 784, 232, 489, 500.25; 426/480, 646

[56] References Cited

U.S. PATENT DOCUMENTS

| 188,429 | 3/1877 | Smith | 210/403 |
| 231,555 | 8/1880 | Gastard | 210/403 |
| 2,105,782 | 1/1938 | Fauth | 210/403 |
| 2,134,703 | 11/1938 | Cobb | 210/404 |
| 2,616,609 | 11/1952 | Carter | 210/404 |
| 2,793,755 | 5/1957 | Richards | 210/404 |
| 3,475,178 | 10/1968 | Zebarth et al. | 210/784 |
| 3,510,002 | 5/1970 | Evans | 210/402 |
| 3,747,770 | 7/1973 | Zentis | 210/402 |
| 3,876,548 | 4/1975 | Welles, Jr. | 210/391 |
| 3,962,091 | 6/1976 | Doria et al. | 210/232 |
| 4,038,187 | 7/1977 | Saffran | 210/402 |
| 4,361,590 | 11/1982 | Wojcik | 426/480 |
| 4,906,364 | 3/1990 | Luthi et al. | 210/232 |

FOREIGN PATENT DOCUMENTS 0113817  7/1982  Japan .................................. 210/499

OTHER PUBLICATIONS

Rotoshear, Bulletin 105-R, Aug., 1983–Hycor Corporation.

Primary Examiner—Robert A. Dawson
Assistant Examiner—Joseph Drodge
Attorney, Agent, or Firm—Riches, McKenzie & Herbert

[57] ABSTRACT

An improved cylindrical rotary screen having as a screen member a composite element comprising a radially inner layer of fine mesh screening supported on a radially outer layer of apertured, expanded metal sheeting. The radially inner layer of fine mesh screening is provided as a number of removable modular panels which are longitudinally slidable in and out of the open discharge end of the cylindrical screen. The rotary screen provides excellent filtration yet is simple to manufacture and maintain.

2 Claims, 2 Drawing Sheets 5,008,010

ROTATING CYLINDRICAL SCREEN WITH FINE MESH MODULAR PANELS

SCOPE OF THE INVENTION

This invention relates to a rotary screen device and, more particularly, to an internally fed rotating cylindrical screen for separating solids from filtrate in an influent stream.

BACKGROUND OF THE INVENTION

Rotating screens are known for use in many applications including in pulp and paper applications, municipal sewage treatment, meat processing, citrus fruit processing, canning, tanning, poultry processing, sugar mill processing and seafood processing.

Known rotary screening devices typically have a hollow screening cylinder journalled for rotation about a horizontal axis. Influent to be screened is internally fed to the interior of the rotating cylinder with filtrate to pass outwardly through the screening cylinder and solids and other materials in the influent which cannot pass through the screening member being retained internally with the cylinder. Rotation of the cylinder moves the solids axially along the cylinder to a discharge end.

Many known screening cylinders are made from wedge wire screen such as that described in U.S. Pat. No. 3,876,548. This screen is made up of a plurality of parallel screen bars in which each bar has an outer face and immediately adjacent side with the angles formed by a line perpendicular to the outer face and immediately adjacent the side being in the range of about 7° to about 45°. Such wedge wire screen has been believed to provide advantageous screening properties. Cylindrical screens made with the wedge wire device suffer the disadvantage that they are expensive and difficult to manufacture. Typically, wedge wire screens are used in minimum opening sizes of 500 microns.

Known rotary screening devices utilize a hollow cylindrical screen which is manufactured as a unitary element. The cylindrical screen is a permanent, fixed part of the screening device. This has a disadvantage that a single screening device cannot be modified so as to accept screens with different mesh sizes and thus permit the device to be utilized at different times for different filtration applications. That the cylindrical screen is a unitary element has the disadvantage that if damaged or severely clogged, either the entire device must be disassembled at substantial time and cost or use of the entire device is prevented until cleaning maintenance can be performed. For example, with a wedge wire device, damage to the wedge wire can require the entire cylinder to be replaced.

Previously known rotary screening devices have suffered the disadvantage that the screening members have not proved satisfactory to adequately remove suspended solids, notably, fat, oil and grease. In particular, in food processing industries, known cylindrical screens have had difficulty in reducing the fat, oil and grease content in products such as poultry and have had difficulty in providing an adequate biochemical oxygen demand or BOD. BOD is a measure of the quantity of oxygen utilized in the biochemical oxidation of organic matter at a specified time and at a specified temperature. New environmental requirements on maximum waste water content of solids, FOG and BOD have greatly increased filtration requirements to levels not met by existing devices.

SUMMARY OF THE INVENTION

Accordingly, to at least partially overcome the disadvantages of previously known devices, the present invention provides a rotary screening device utilizing as the screen member, a composite element comprising an inner layer of fine mesh screening supported on a supportive apertured support sheet layer. To overcome other disadvantages of the prior art, the present invention provides a rotary screening device in which the screening member comprises a number of modular, removable panels.

It is an object of the present invention to provide an improved yet simplified screening member which can be manufactured at low cost yet provide improved filtration properties.

It is another object of the present invention to provide a screening member comprising a composite of a fine mesh screen supported on a radially-outer support sheet having apertures therethrough larger than the appertures of the fine mesh.

A further object of this invention is to provide a cylindrical screen member having modular elements which permit removal of segments of the screen member for cleaning, maintenance and replacement.

It is an object of the present invention to provide a cylindrical screen whose screening surfaces comprise modular panels which can readily be exchanged.

It is an object of the present invention to provide a screening device and a method for its use which reduces suspended fat, oil and grease solids in influents, or lowers the BOD levels in influents, to acceptable levels as may be required in the food industry.

Accordingly, in one of its aspects, the present invention provides a rotary screening device in which the screening member comprises a radially inner layer of fine mesh screening supported on a radially outer layer of supportive sheeting having apertures therethrough larger than the apertures of the fine mesh.

In another aspect, the present invention provides a cylindrical screening member comprising a number of removable panels secured to an open framework. Each panel preferably extends longitudinally of the cylinder and forms a segment of its circumference. The modular panels are preferably interchangeable and may be readily attached and removed. This permits clogged panels to be removed for cleaning and some or all of the panels to be replaced by panels of different mesh sizes permitting the device to be used in different applications.

In one aspect the present invention provides a rotary screening device comprising:

a hollow cylinder journalled for rotation about its central, generally horizontally disposed, axis, cylindrical walls of the cylinder, comprising, substantially in their entirety, screening surfaces of a screen member, the cylinder having an inlet end and an outlet end at opposite ends of its interior, means for rotating the cylinder, means for directing influent to be screened into the interior of the cylinder via the inlet end and onto the screening surface, trough means under the cylinder to collect filtrate from the influent which passes through the screen member, wherein on rotation of the cylinder, portions of the influent which does not pass through the screen member is moved along the cylinder from the inlet end towards the discharge end, the improvement wherein:

the screen member comprises a radially inner layer of fine mesh screening supported on a radially outer layer of supportive sheeting means having apertures therethrough larger than apertures of the fine mesh screening.

BRIEF DESCRIPTION OF THE DRAWINGS

Further aspects and advantages of the present invention will appear from the following description taken together with the accompanying drawings in which.

DETAILED DESCRIPTION OF THE DRAWINGS

Figure 1:
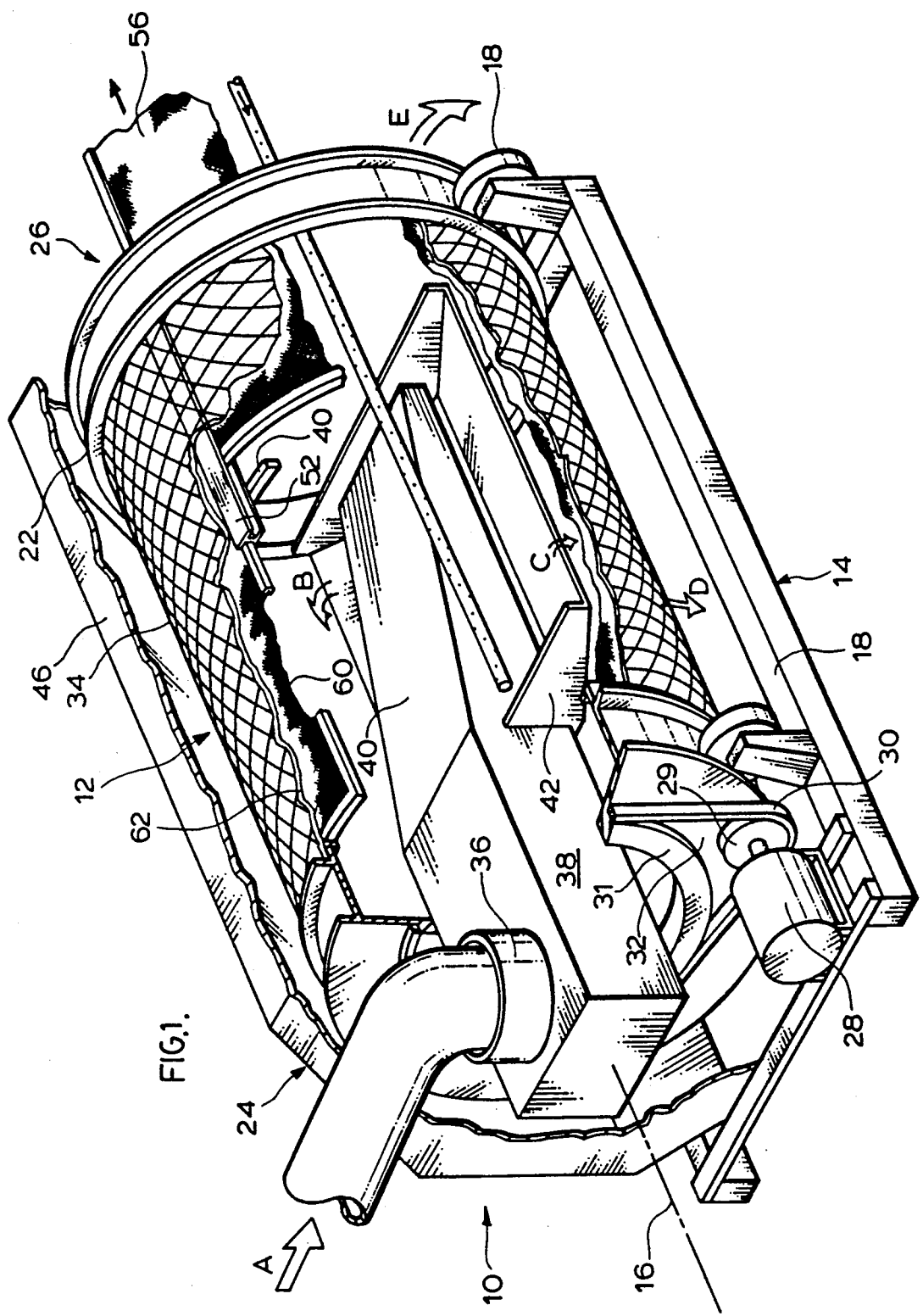
FIG. 1 is a partially cut away pictorial view showing a rotary screening device in accordance with a preferred embodiment of this invention.
Figure 2:
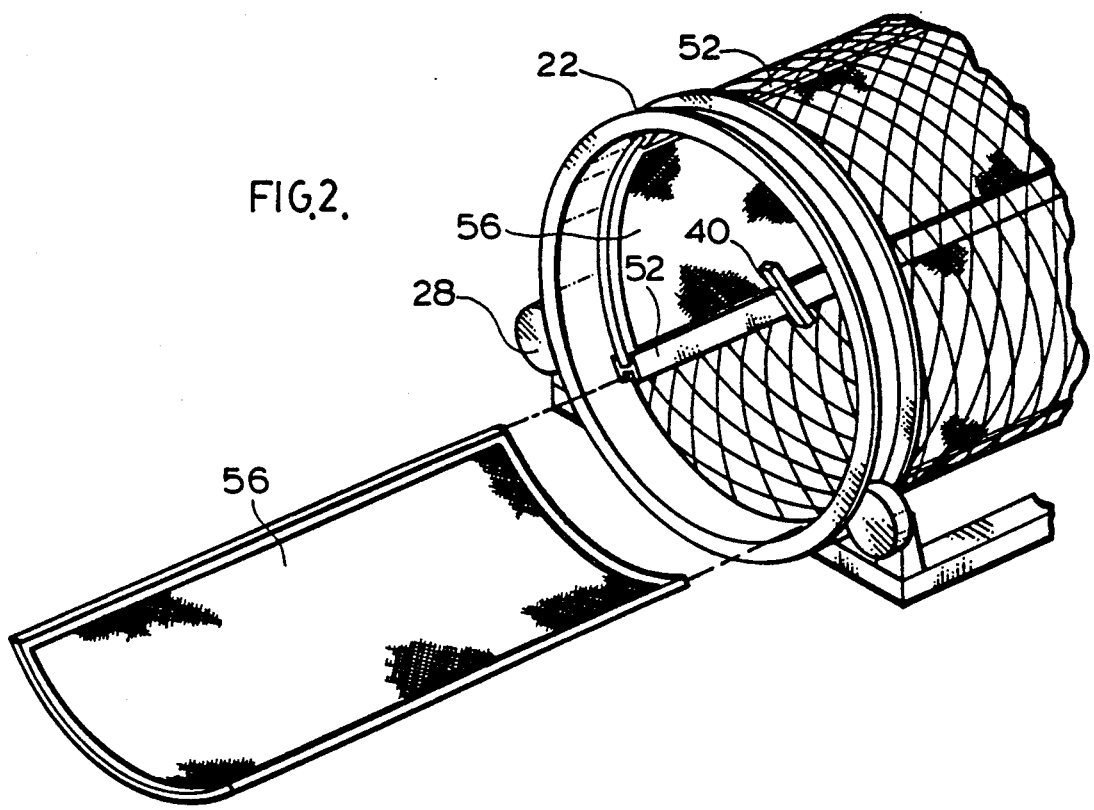
FIG. 2 is a schematic partially exploded view showing the cylinder, its framework and removable screen panels.
Figure 3:
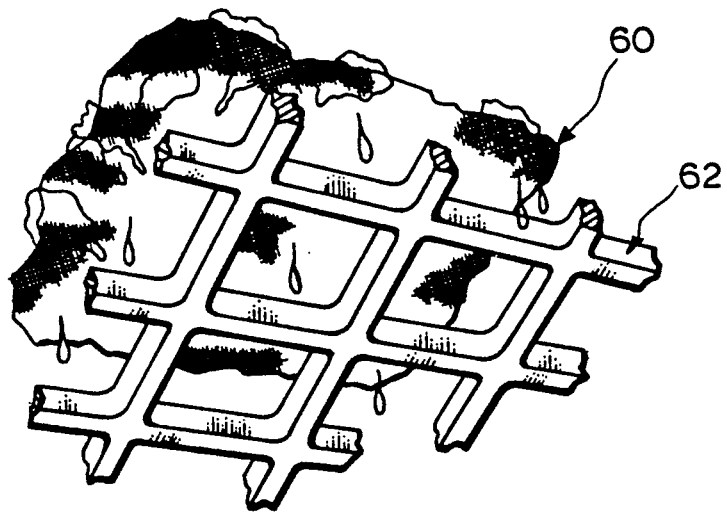
FIG. 3 is an exploded view of a small section of a screen panel as seen in FIG. 1 showing the two layers thereof.

Reference is made first to FIG. 1 which shows a pictorial view of a preferred embodiment of a rotary screen device 10 in accordance with the present invention. A hollow cylinder generally indicated 12 is supported on a frame 14 journalled for rotation about its axis 16 with the axis generally horizontal. As seen, the frame comprises side and end members. Four rollers 18 are supported on frame 14 and these rollers engage outer cylindrical surfaces of cylindrical end frame members 20 and 22 at the inlet end 24 and the discharge end 26, respectively, of the cylinder 12.

As a system for rotating cylinder 12, there is shown a chain drive mechanism comprising a drive motor 28 carrying a drive sprocket 29 which engages chain 30 passing about driven sprocket 31 secured to a radially inwardly extending flange 32 of circular end frame member 20. Drive motor 28 rotates cylinder 12 about its axis 16 journalled thereabout via rollers 18 engaging the end frame members 20 and 22.

Cylinder 12 carries substantially over the entirety of its surface a screen member generally indicated 34 which will be described later in greater detail. Influent to be screened is received in a header inlet 36 from which it passes to a feedchute 38 directing influent to a tapered header 40 whose bottom opens into headbox 42. Influent flowing in inlet head 36 passes via the feedchute 38 and header 40 to flow radially outward from either side of the headbox 42 as indicated by arrows A, B and C in the figures.

The influent is thus directed into contact with the radially inner surfaces of the screen member 34. On contact with the screen member 34, filtrate passes through the screen member 34 as indicated by arrow D and material to be collected which cannot pass through the screen member 34 is retained on the screen member 34 and, ultimately, discharged out the discharge end 36 as indicated by arrow E. Solids captured on the screen are retained on the screen and due to rotation of the cylinder 12 are moved to the discharge end 26. Movement of the solids is accomplished by axis 16 being tilted at a small angle to the horizontal towards the discharge end and/or with angled diverter vanes 40 being provided on inside surfaces of the cylinder.

The diverter vanes 40 may be a continuous radially inwardly extending helical vane or may comprise a series of short lengths of radially inwardly extending vanes, one of which is shown as 40 in FIG. 1, generally arranged in a spiralling pattern to assist in movement of the solids to the discharge end on rotation of the cylinder.

As shown only in part in FIG. 1, a removable cover 46 is provided about cylinder 12. The cover 46 along the side of the cylinder serves the function of a chute to direct filtrate down into the center of frame 14 for collection.

Cylinder 12 has a novel construction in accordance with the present invention. Cylinder 12 has an outer apertured supporting sheet 62 secured as by welding cylindrically about end frame members 20 and 22. Supporting sheet 62 is shown as a sheet of metal with large openings therethrough. Inside of sheet 62, a fine mesh screening 60 is provided. Screening 60 is provided as a number of modular panels, in the case of FIG. 1, four indentical modular screen panels 56. Each panel 56 is located in use so as to extend the length of the cylinder 12 and each cover a quarter of the circumference of the cylinder. In this manner, the screen member comprises as a radially inner layer, the fine mesh screening 60 and as a radially outer layer, supportive sheeting 62.

The fine mesh screening 60 comprises known wire mesh screenings of, for example, having seive openings in the range of 45 to 5,000 microns. Preferably, the screening 60 has a mesh with seive openings in the range of 250 to 500 microns. Preferably, the screening 60 may comprise a stainless steel grid of fine wire filament.

The supportive sheeting 62 is provided radially outwardly from the fine mesh screening 60 and serves the purpose of structurally supporting screening 60. The supportive screening 62 has apertures therethrough larger than the apertures of the fine mesh screening 60 with the supportive sheeting 62 having sufficient apertures to permit flow of filtrate therethrough. Supportive sheeting may be selected from any commercially available products including low gage metal sheeting having a plurality of apertures punched therethrough. One preferred type of metal sheeting as shown is a metal sheeting comprising a lattice work used, for example, in the flooring of catwalks and the like around industrial complexes. One such sheeting is sold by Expanded Metal Corporation under the trade mark DRAMEX. Preferably, this sheeting is between 1/16" and ¼ in thickness and has openings in the range of ¼ to 4". The supportive sheeting may comprise a wire mesh screening formed with substantially larger openings in the wire mesh screening 60 and having sufficient strength to support the wire mesh sheeting 60 in normal use of the screening device.

Each panel 56 is removably secured to cylinder 12. As shown, cylinder 12 includes four parallel straight frame members 52 which join the circular end frames 20 and 22 at circumferentially spaced locations. Straight frame members 52 carry radially inwardly extending protrusions which define longitudinally extending slots to receive edges of each panel 56. Each panel 56 is thus axially slidable from the discharge end into cylinder 12 with the edges of each panel received in the slots on adjacent straight frame members 52. Preferably, each panel 56 may have a thin peripheral frame to assist in giving the edges of the panel rigidity and in sliding insertion into the cylinder.

With the screening device of this invention, if during operation, it is desired to change or replace one of the screen panels 56, this can readily be accomplished by removing the existing screen panel 56 and replacing that screen panel by another similar modular screen panel. By having extra sets of the modular screen panels 56, if a screen panel may become damaged or unduly clogged, it can be a relatively simple matter to remove one of the screen panels and replace it by another. Similarly, should the device be desired to be modified so as to use screen member 34 with different screen properties, the modular screen panels 56 can be replaced by other panels which have different mesh sizes.

The double layer construction of the screen cylinder provides a simple and inexpensive construction for the screen member without sacrificing filtration qualities. Both the fine mesh screen 60 and the support sheeting 62 can comprise commercially available materials. By providing the inner layer as a number of modular screen panels 34, this substantially reduces the cost of manufacture of the entire unit.

Surprisingly, the dual-air construction of the screen member 34 with the fine mesh screening 60 and the supportive sheeting 62 has been found to provide and enhance filtration without difficulties regarding clogging. In a known manner, water spray pipes 68 may be provided with a plurality of nozzles along its length to spray water onto the screen 34 and assist in cleaning.

While the invention has been described with reference to a preferred embodiment, it is not so limited. Many variations and modifications will now occur to those skilled in the art. For a definition of the invention, reference is made to the following claims.

What I claim is:

1. In a rotary screening device comprising:
a hollow cylinder journalled for rotation about its central, generally horizontally disposed, axis,
cylindrical walls of the cylinder, comprising, substantially in their entirety, screening surfaces of a screen member,
the cylinder having an inlet end and an outlet end at opposite ends of its interior,
means for rotating the cylinder,
means for directing influent to be screened into the interior of the cylinder via the inlet end and onto the screening surface,
trough means under the cylinder to collect filtrate from the influent which passes through the screen member,
wherein on rotation of the cylinder, portions of the influent which do not pass through the screen member are moved along the cylinder from the inlet end towards the discharge end,
the improvement wherein:
the screen member comprises a radially inner layer of fine mesh screening with mesh sizes in the range of 150 to 500 microns supported on a radially outer layer of supportive sheeting means having apertures therethrough larger than apertures of the fine mesh screening,
the cylinder having a framework of circular end frame members jointed by a plurality of parallel straight frame members connecting the end frame members at circumferentially spaced locations to define circumferentially spaced open segments between straight frame members,
the supportive sheeting means are permanently secured to said framework forming a cylindrical shape therewith,
longitudinally extending slot forming means on the parallel straight frame members being provided radially inwardly of the supportive sheeting means on either side of each open segment,
said fine mesh screening comprises a plurality of similar modular panels,
each panel is sized to cover one of the open segments with edge portions of the panel being axially slidably received in the slot forming means and is constructed and arranged to be separately removable by sliding axially out of the interior of the cylinder via the discharge end.

2. An improved rotary screening device as claimed in claim 1 wherein said outer layer comprises a metal mesh with mesh size in excess of 4000 microns.

* * * * *